May 3, 1932. H. HALPERIN ET AL 1,856,415
METHOD OF TREATING INSULATING SLEEVES
Filed Feb. 25, 1928
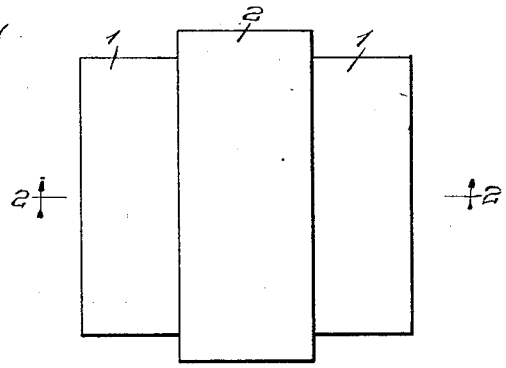
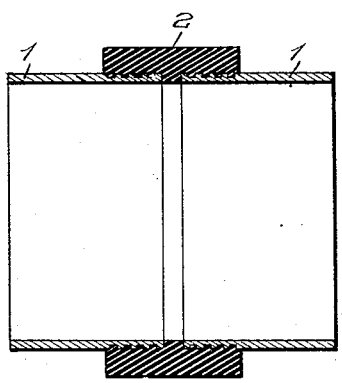
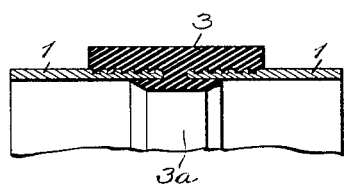
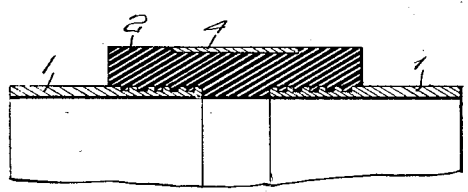
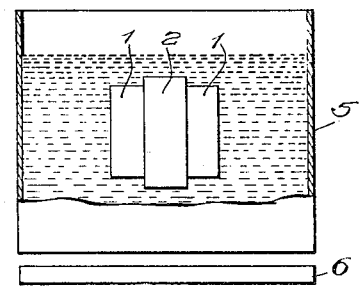
Witness:
William P. Kilroy
Inventors
Herman Halperin
Alexander P. Thoms
By Brown Jackson Boettcher Dienner
Att'ys Patented May 3, 1932

1,856,415

UNITED STATES PATENT OFFICE

HERMAN HALPERIN AND ALEXANDER P. THOMS, OF CHICAGO, ILLINOIS

METHOD OF TREATING INSULATING SLEEVE

Application filed February 25, 1928. Serial No. 257,090.

This invention relates to insulating sleeves for use in the insulating joints of cable sheaths, and has to do more particularly with a method of treating such sleeves to render them air and moisture tight.

It is essential that the insulating joints of the cable sleeves be resistant to the action of the air and liquids, such as water, weak acids, alkalies, and the various agencies that operate upon the cable sheaths, and that such joints be air and moisture tight.

According to our invention we provide as an article of manufacture an insulating sleeve comprising a pair of light cylindrical thimbles or ferrules bonded to each other mechanically, but separated electrically, by a body of insulation formed in place. In the preferred embodiment of our invention the body of insulation consists of a ring of a synthetic resinous or phenol condensation product formed in place upon the ends of two similar brass thimbles or ferrules. The manner of securing a tight fit and an effective closure between the insulating material and the metal of the ferrules is an important feature of our invention.

In forming the insulating sleeve the two metal rings or ferrules are placed in a suitable mold in spaced relation and the ring of insulating material employed is molded about the adjacent end portions of the ferrules, the mold being heated so as to render the insulating material plastic and insure close contact thereof with the metal ferrules, also facilitating the molding operation. During this molding of the insulating material about the ferrules, the ferrules and the insulating material becomes unequally heated due to the impossibility, from a practical standpoint, of uniformly heating the sections of the mold throughout the entire mass thereof, and the fact that the metal ferrules conduct the heat much more readily than the insulating material. As the co-efficient of expansion of the insulating ring is different from the co-efficient of expansion of the metal ferrules, when the sleeve is removed from the mold and cooled a slight space may be left between the ring and the outer faces of the end portions of the ferrules imbedded therein. These spaces are objectionable as being a possible source of leakage while also rendering the mechanical construction of the sleeve imperfect. We have found this objection can be avoided by properly heating the sleeve, after completion thereof, so as to raise the component parts of the sleeve to the same temperature, and then slowly cooling the sleeve. This heating of the sleeve is preferably conducted in a liquid of suitable character to effect a seal about the inner ends of the ferrules. An oleaginous material, such as an oil or grease heated to a proper temperature to penetrate the spaces referred to, is preferably employed for this purpose. Further objects and advantages of our invention will appear from the detailed description.

In order that those skilled in the art may more readily understand our method, we have illustrated several forms of insulating sleeves constructed in accordance with our invention, though we do not limit ourselves to these particular forms of sleeves as our invention can be applied to advantage to sleeves of various types in which a metallic member or ferrule is used with an insulating member or ring formed of synthetic resin or a phenol condensation product or the like or other insulating material which is molded about a metal member.

In the drawings:

Figure 1 is an elevation of an insulating sleeve constructed in accordance with our invention;

Figure 2 is a longitudinal sectional view through the sleeve shown in Figure 1;

Figure 3 is a sectional view through a modified form of the sleeve;

Figure 4 is a sectional view through a second modified form of sleeve;

Figure 5 is a view illustrating diagrammatically the treatment of the sleeve in an oil bath.

In the form of sleeve of Figures 1 and 2, two brass ferrules 1 are secured together by an insulating ring 2, formed of a suitable phenol resinous product or the like. The inner end portions of the ferrules 1 are preferably provided with spaced circumferential grooves so as to be, in effect, corrugated. The outer faces of the ribs or corrugations thus formed are preferably knurled so as to obtain a better mechanical connection between the ferrules 1 and the ring 2.

In the form of sleeve illustrated in Figure 3, the insulating ring 3 extends inwardly between the ends of the ferrules 1 beyond the inner spaces and toward each end thereof providing, in effect, an inner head 3a of the ring which effectively encloses the end portions of the ferrules.

The modified form of sleeve illustrated in Figure 4 is similar to that of Figures 1 and 2 except that a metallic ring 4 is set into the outer periphery of the insulating ring 2.

The several forms of sleeves illustrated and described are formed in suitable molds consisting of relatively large metal parts, these molds being heated at the two ends and exposed to the air on their sides. In these molds the insulating material is molded onto the brass ferrules at a temperature of approximately 350° F. Usually about fourteen minutes is required to mold the sleeve which is then removed from the mold and allowed to cool in the air. If desired, the sleeve when removed from the mold can be placed in a suitable oven and slowly cooled by permitting cooling of the oven. In either case, we have found that there is a possibility of leakage between the insulating ring and the brass ferrules or the sleeves due to unequal expansion and contraction thereof, as previously pointed out. It is necessary to use, for the insulating ring, a material of high dielectric strength. We have found the synthetic resin known as a phenol condensation product particularly suited for this purpose as it is relatively non-hygroscopic, absorbs very little moisture, possesses very appreciable mechanical strength, and has a dielectric strength of the order to 200 volts per mil in thickness. The ferrules are preferably of brass which has a co-efficient of expansion of approximately .000020 inches per degree rise Centigrade whereas the synthetic resin known as a phenol condensation product such as proposed herein has a coefficient of approximately .000025. By using these two materials we reduce the tendency for the contacting surfaces of the insulating material and the brass rings to separate. While the sleeve constructed in this manner is fluid tight under pressure, in many instances, we have found that a slight leakage between the ring and the ferrule can be detected at times. This leakage can be detected by subjecting the sleeves to a proper test such as closing the ends of the sleeve and forcing air into it under a pressure of from 25 to 60 lbs. per square inch.

It is essential, as above pointed out, that the insulating sleeves be effectively sealed against leakage. We have found that this can be accomplished by treating the sleeve, after the same has been formed in the mold, in a suitable manner to raise the component parts of the sleeve to the same temperature and seal any slight spaces which may be present between the insulating ring and the ends of the ferrules. In accordance with our invention, the sleeve is subjected to a heat treatment in a suitable oleaginous material, such as oil or grease, and is then cooled. In Figure 5 of the drawings we have shown a suitable container 5 in which is placed a suitable quantity of oil, this oil being heated by an electric plate 6, or other suitable heating means, beneath the container 5.

A suitable oil or grease is placed in the container 5 and is heated to a temperature of approximately 275° F. We have found that many materials can be used such as thin transformer oil, heavy cylinder oil, linseed oil, or grease. The sleeve is immersed in the hot bath of oil or grease which is then allowed to cool, which usually takes about two hours, the sleeve remaining in the bath during cooling thereof. The sleeve may be placed in the bath after it has been heated to the proper temperature of approximately 275° F., or it may be placed in the bath before heating thereof, as desired. We have found that sleeves treated in this manner will not leak when filled with air at a pressure of 60 lbs. per square inch, or when subjected to a vacuum corresponding to about one millimeter of mercury in absolute pressure. Many sleeves constructed and treated in accordance with our invention have been installed and in active service for many months, and none of these have developed leaks. Other sleeves which have not been installed have been subjected to pressure tests periodically and have shown no signs of developing leaks so that sleeves treated in accordance with our method are rendered permanently air and moisture tight.

In just what manner the heat treatment of the sleeve effects sealing thereof is not fully understood in all respects. When the sleeve is first formed in the mold and has been cooled, the insulating material does not have perfect contact with the ferrules throughout the entire circumference thereof, as previously pointed out. It is thought that when the sleeves are heated in oil or other suitable oleaginous material, in the manner described, the component parts of the sleeve are heated uniformly to the same temperature. As the co-efficient of expansion of the insulating material is slightly greater than the co-efficient of expansion of brass, the synthetic resin expands slightly more than the brass and allows a film of oil or grease to enter between the ferrule and the insulating ring. It is also probable that any imperfections in the inner surface of the insulating material are filled with the oil or grease and it may be that the outer grooves, at least, of the ferrules are covered with a film of oil or grease. It is thought that these films are trapped as the sleeve cools and the insulating ring contracts about the ferrules, thus providing a seal which renders the connection between the ring and the ferrule air and water tight. The operating temperatures of the insulating sleeve in use would vary between 35° F. and 90° F. As the sleeve is subjected to a temperature of 275° F. during the treatment thereof, the temperatures to which the sleeve is subjected under actual conditions of use will not affect nor in any way tend to destroy the seals about the ends of the ferrules. In experiments, the sleeves treated in this manner were alternately placed in cold water, and in boiling water, several times and then tested. The test gave no indication of any decrease in the effectiveness of the seals between the ring and the ferrules.

Articles which are molded from synthetic resins are open to the objection that they warp out of shape. This is probably due to mechanical stresses imposed during molding of the article under pressure. We have found that this objection can be avoided by heat treating the molded article in a proper manner to let down or relieve these internal stresses. In the specific embodiment of our invention herein set forth, this heat treatment consists in heating the article in a fluid bath at a temperature below the softening temperature of the synthetic resin used and then cooling it. The particular temperature employed may vary, but we have found a temperature of approximately 275° F. well suited for this purpose. Our invention comprehends, in its broader aspect, heat treating an article molded of the synthetic resin known as Bakelite and analogous materials, which we believe to be broadly new.

While we have described our method as being applied specifically to a sleeve comprising a ring formed of a synthetic resin and brass ferrules, it has been found equally effective in treating a sleeve comprising a synthetic resin molded on lead tubing. We do not, therefore, limit our invention to the specific combination of a synthetic resin and brass, since it is adapted for use with structures of various types in which phenol condensates and similar materials are molded upon metal elements associated therewith.

What we claim is:

1. The method of treating an article pressure molded from a condensation product and completely cured, consisting in immersing the article in a fluid bath heated to a temperature below the softening temperature of the molded product but sufficiently high to relieve the internal stresses of such article, and then cooling the article.

2. The method of rendering fluid tight during use the joint of an article formed of inseparably joined elements having different coefficients of expansions, one of which is formed of a condensation product, consisting in flowing sealing fluid which is immiscible in water into spaces existing between said elements, then trapping said fluid in said spaces and maintaining the component parts of the article joined together during use of the article after treatment.

3. The method of rendering fluid tight during use the joint in an article formed of inseparably joined elements having different coefficients of expansion, one of which is formed of a condensation product, consisting in heating the article, flowing a sealing fluid which is immiscible in water into spaces existing between the elements, then cooling the article thereby contracting said elements and trapping the fluid in said spaces and maintaining the component parts of the article joined together during use of the article after treatment.

4. The method of rendering fluid tight during use the joint in an article formed of a metal element and an element formed of a condensation product molded about said metal element and inseparably joined thereto, consisting in heating the article and thereby causing expansion of said element, flowing a sealing fluid which is immiscible in water into spaces existing between the elements, then cooling the article thereby contracting the elements thereof and trapping the fluid in said spaces and maintaining the component elements of the article joined together during use of the article after treatment.

5. The method of forming an insulating sleeve of molded insulation and metal and rendering the joint between the insulation and metal fluid tight during use which consists in first molding the insulating material inseparably upon the metal and thereafter subjecting the sleeve of metal with the insulating material inseparably molded thereon to treatment in a heated liquid immiscible in water, depositing said liquid in spaces existing between the insulation and the metal and then cooling the sleeve of insulation and metal.

6. The method of forming an insulating sleeve of molded insulation and metal and rendering the joint between the insulation and metal fluid tight during use which consists in molding the insulating material inseparably upon the metal and thereafter subjecting the sleeve of metal with the insulating material inseparably molded thereon to treatment in a bath of heated oil and causing said oil to enter and be deposited in spaces existing between the insulation and the metal and cooling the sleeve of insulation and metal.

7. The method of forming an insulating sleeve of molded insulation and metal and rendering the joint between the insulation and metal fluid tight during use which consists in molding the insulating material inseparably upon the metal and thereafter immersing the sleeve of metal with the insulating material inseparably molded thereon in a bath of oil heated to a temperature below the softening temperature of the molded insulation and causing said oil to enter and be deposited in spaces existing between the insulation and metal, and then cooling the sleeve of insulation and metal.

In witness whereof, we hereunto subscribe our names this 21st day of February, 1928.

HERMAN HALPERIN.
ALEXANDER P. THOMS.